US006772054B1

(12) United States Patent
Achache

(10) Patent No.: US 6,772,054 B1
(45) Date of Patent: Aug. 3, 2004

(54) DEVICE FOR OPERATING A CONTROLLED MEMBER ON A ROTARY-WING AIRCRAFT, PARTICULARLY A HELICOPTER

(75) Inventor: Marc Achache, Marseilles (FR)

(73) Assignee: EUROCOPTER, Marignane Cedex (FR)

( * ) Notice: Subject to any disclaimer, the term of this patent is extended or adjusted under 35 U.S.C. 154(b) by 520 days.

(21) Appl. No.: 09/190,318

(22) Filed: Nov. 12, 1998

(30) Foreign Application Priority Data

Nov. 14, 1997 (FR) .............................................. 97 14293

(51) Int. Cl.⁷ ........................... B64C 1/00; B64C 13/30; G05D 1/00; G06F 17/00
(52) U.S. Cl. ........................... 701/3; 244/227; 244/228; 244/229; 244/232
(58) Field of Search ........................... 701/3; 244/35 R, 244/17, 7 A, 8, 11, 13, 229, 232, 226, 227, 228, 230, 231, 233

(56) References Cited

U.S. PATENT DOCUMENTS

| | | | | |
|---|---|---|---|---|
| 4,079,906 A | * | 3/1978 | Durandeau et al. | 244/194 |
| 4,573,125 A | * | 2/1986 | Koenig | 701/3 |
| 4,887,214 A | * | 12/1989 | Takats et al. | 701/3 |
| 5,149,023 A | * | 9/1992 | Sakurai et al. | 244/229 |
| 5,456,428 A | * | 10/1995 | Hegg | 244/229 |
| 5,489,830 A | * | 2/1996 | Fernandez | 318/628 |
| 5,510,991 A | | 4/1996 | Pierson et al. | 364/434 |
| 5,560,570 A | * | 10/1996 | Pierson et al. | 244/195 |
| 5,908,177 A | * | 6/1999 | Tanaka | 244/223 |

OTHER PUBLICATIONS

"Sperry Multifunction Control Actuator", Aviation Week & Space Technology, vol. 112, No. 11, Mar. 17, 1980, p. 42.
S. Damotte et al., "Evaluation of Advanced Control Laws Using a Sidestick on the Experimental Fly–By–Wire Dauphin Helicopter", Proceedings of the European Rotorcraft Forum, Sep. 15–18, 1992, Avignon, France, pp. 1–10.

* cited by examiner

Primary Examiner—William A. Cuchlinski, Jr.
Assistant Examiner—B J Broadhead
(74) Attorney, Agent, or Firm—Marshall, Gerstein & Borun LLP

(57) ABSTRACT

An apparatus for operating a controlled member on a rotary-wing aircraft is provided with at least one control intended to be subject to the action of a pilot of the rotary-wing aircraft and capable of moving a linkage, a device connected to the linkage for operating the controlled member as a function of movement of the linkage, a ram incorporated into the linkage which is capable of influencing the movement of the linkage as a function of control commands received, a trim device capable of acting on the control and on the linkage as a function of control commands received, a computer determining the control commands which are transmitted to the ram and to the trim device, and at least one sensor which is capable of measuring the values of a parameter that represents an action exerted by a pilot of the rotary-wing aircraft on an auxiliary control.

4 Claims, 2 Drawing Sheets

Figure 1:
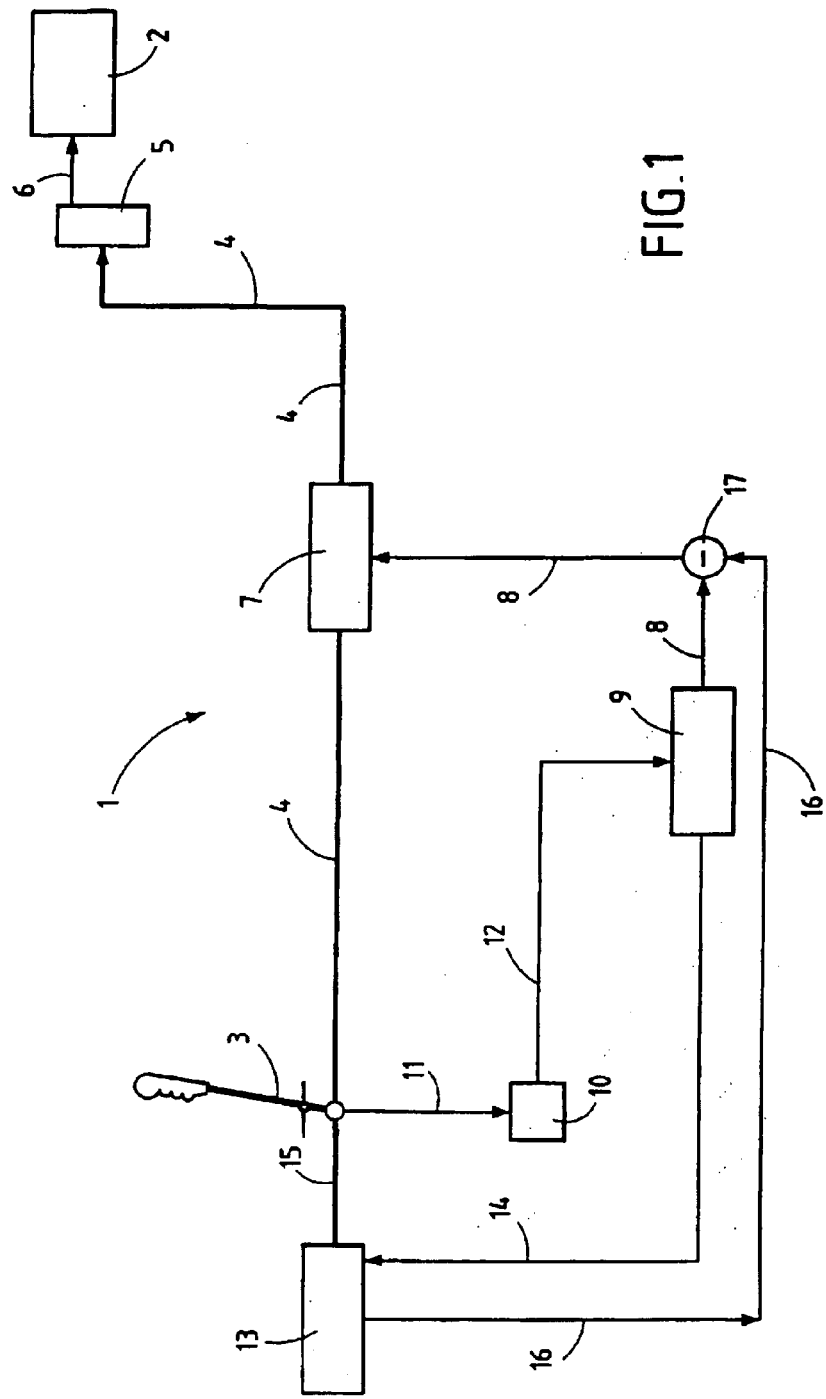

DEVICE FOR OPERATING A CONTROLLED MEMBER ON A ROTARY-WING AIRCRAFT, PARTICULARLY A HELICOPTER

BACKGROUND OF THE INVENTION

The present invention relates to a device for operating a controlled member on a rotary-wing aircraft, particularly a helicopter.

In the case of a helicopter, said controlled member may be the main lift and forward propulsion rotor or the counter-torque tail rotor.

More specifically, the present invention applies to a rotary-wing aircraft equipped with an automatic control system, that is to say a system that assists with stabilizing or increasing the stability of the aircraft.

As is known, the device for operating the main rotor or the tail rotor of a helicopter comprises:

at least one control, for example a stick or rudder bar, intended to be subject to the action of a pilot of the aircraft and capable of moving a linkage;

means, generally a servocontrol, connected to said linkage for operating the controlled member as a function of the movement of said linkage;

a ram incorporated into the linkage and capable of influencing the movement of said linkage as a function of control commands received and which represent the automatic control;

a trim means, usually known as a "trim ram" and which is capable of acting via a flexible link (spring box for example) on the control and on the linkage as a function of control commands received and which represent the automatic control; and a computer determining said control commands which are transmitted to said ram and to said trim means.

Said control commands relating to the automatic control are therefore combined with those generated by the action of the pilot on the control.

This automatic control is essentially intended to lessen the extreme effects of the operation of the control, particularly with a view to stabilizing the aircraft.

Although the aforementioned device is very safe and reliable because it is essentially a mechanical system (linkage), the control achieved using such a device displays drawbacks and, in particular, is less comfortable, particularly by comparison with fly-by-wire controls, and finds it increasingly difficult to meet all the requirements that have to be met by a present-day rotary-wing aircraft, the missions of which require extremely high performance.

It is known that fly-by-wire controls give better performance control, particularly as far as flight comfort is concerned.

As is known, such fly-by-wire controls comprise a computer which, using so-called evolved laws, determines control objectives as a function of information relating to the operation of the control and which achieves these objectives in such a way as to obtain the aforementioned high-performance control.

However, such fly-by-wire controls have drawbacks, particularly:

high cost, particularly compared with the cost of a conventional automatic-control device like the aforementioned; and the need to provide means capable of compensating for any failure, even partial failure, of these fly-by-wire controls.

To achieve this, there is generally redundancy between the various elements of said fly-by-wire controls, and this is of course complicated and expensive.

SUMMARY OF THE INVENTION

The object of the present invention is to overcome these drawbacks. This invention relates to a device for operating a controlled member on a rotary-wing aircraft, particularly a helicopter, which, while at the same time being lower in cost and more dependable, provides particularly high-performance control.

To this end, according to the invention, said device which comprises:

at least one control intended to be subject to the action of a pilot of the rotary-wing aircraft and capable of moving a linkage;

means, generally a servocontrol, connected to said linkage for operating said controlled member as a function of the movement of said linkage;

a ram incorporated into the linkage and capable of influencing the movement of said linkage as a function of control commands received;

a trim means ("trim ram") capable of acting on the control and on the linkage as a function of control commands received; and a computer determining said control commands which are transmitted to said ram and to said trim means, is noteworthy in that it additionally comprises at least one sensor which is capable of measuring the values of a parameter that represents an action exerted by a pilot of the rotary-wing aircraft on an auxiliary control, and in that said computer uses the values measured by said sensor to determine said control commands with a view to creating control objectives.

Thus, by virtue of the invention, said computer can determine control commands from known evolved laws of the type used in fly-by-wire controls, so that said device, although being of the conventional type with automatic control, allows the rotary-wing aircraft to be controlled using objectives.

As a result, the device in accordance with the invention:

allows high-performance control of the type achieved with fly-by-wire control;

while at the same time displaying:

high dependability, owing to the fact that it is essentially a mechanically-based system and can continue to operate when its electrical part (essentially the computer) breaks down; and a low cost, because it is based on a conventional mechanical device and requires no redundancy between its constituent elements.

In the context of the present invention, said computer takes into account, when calculating said control commands, information from the pilot, but which differs from the actual position of the control. As a preference, according to the invention, the parameter measured by said sensor and taken into account by said computer is:

either the force applied by the pilot to the auxiliary control;

or the relative movement of said auxiliary control with respect to the position of the trim means.

The present invention is particularly applicable to an aircraft in which the trim means is activated, in the usual way, when said control is not being operated by the pilot.

In this case, said trim means is advantageously also activated when the control is being operated by the pilot.

In the context of the present invention, the control and the auxiliary control may be produced in different ways.

In a first, simplified, embodiment, they form one and the same control, whereas in a second embodiment, said control and said auxiliary control are separate and are set out on the rotary-wing aircraft in such a way as to be accessible and operable by one and the same pilot of said aircraft.

Furthermore, in a third embodiment applied to a rotary-wing aircraft flown by two pilots, advantageously said control is subject to the action of one of said pilots and said auxiliary control is subject to the action of the other pilot.

In the aforementioned second and third embodiments, said control is preferably a conventional control of the cyclic stick or rudder bar type and said auxiliary control is of the mini-stick type.

Furthermore, in a fourth, improved, embodiment, said control and said auxiliary control are adapted to one another so as to form a single assembly, while at the same time being able to be operated separately.

The figures of the appended drawing will make it easy to understand how the invention may be achieved. In these figures, identical references denote similar elements.

Figure 2:
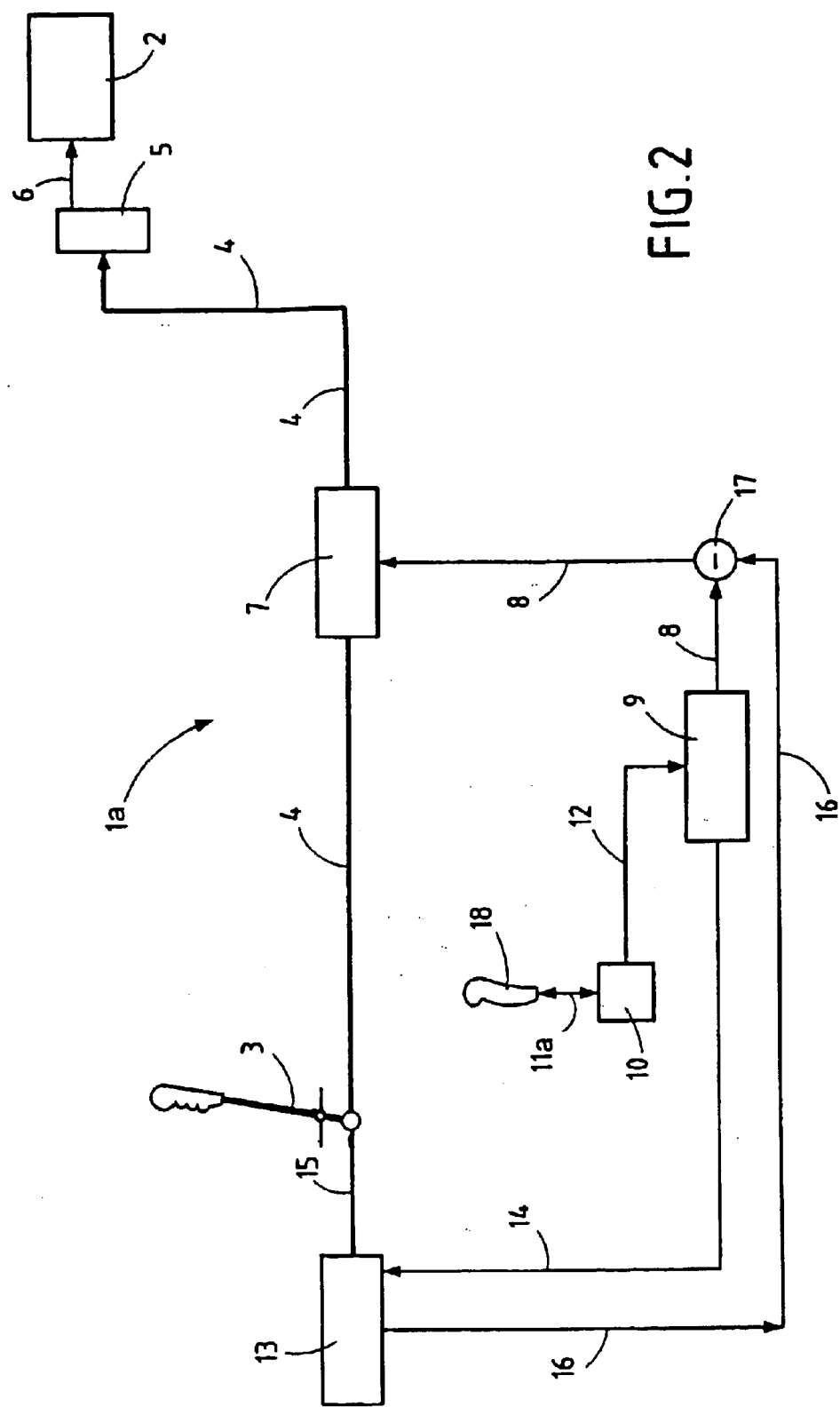

FIGS. 1 and 2 diagrammatically illustrate a device in accordance with the invention, in first and second embodiments respectively.

DETAILED DESCRIPTION OF THE PREFERRED EMBODIMENTS

The device 1, (which includes two versions 1 and 1a) in accordance with the invention and depicted diagrammatically in two different embodiments in FIGS. 1 and 2 respectively, is intended to operate a controlled member 2 on a rotary-wing aircraft, not depicted.

Said controlled member 2 may, in particular, be the main lift and forward propulsion rotor or the countertorque tail rotor of a helicopter.

Said device 1 is of the type comprising:

at least one control 3 depicted in the form of a stick in FIGS. 1 and 2, intended to be subject to the action of a pilot, not depicted, of the rotary-wing aircraft and capable of moving a linkage 4. The control may, however, also be a rudder bar or a mini stick;

means 5, preferably a servocontrol, connected to said linkage 4 for operating said controlled member 2, as indicated by a link 6, as a function of the movement of said linkage 4;

a ram 7 incorporated into the linkage 4 and capable of influencing the movement of said linkage 4 as a function of control commands received via a link 8;

a trim means 13 of the "trim ram" type specified hereinbelow; and a computer 9 determining said control commands which are transmitted to said ram 7.

According to the invention, said device 1 additionally comprises, as depicted in FIG. 1, a sensor 10 specified hereinbelow, which is capable of measuring the values of a parameter that represents an action exerted by a pilot of the rotary-wing aircraft on said control 3 as indicated by a link 11, and said computer 9 uses the values measured by said sensor 10 and received via a link 12 to determine said control commands, on the basis of evolved laws, which commands according to the invention relate to control objectives.

According to the invention, said sensor 10 does not measure the "absolute" movement of the control 3, but measures:

either the relative movement of the latter with respect to the position of the trim means 13;

or the force applied to said control 3 by the aircraft pilot.

In the latter case, said sensor 10 is preferably produced in the form of a strain gauge or an inductive transducer.

Thus, by virtue of the invention, said computer 9 can determine control commands on the basis of evolved laws of the type used in fly-by-wire controls so that said device 1, although being of the conventional type with automatic control, allows the rotary-wing aircraft to be controlled using objectives.

As a result, the device 1 in accordance with the invention:

allows the use of a high-performance control system of the type generated by fly-by-wire controls;

while at the same time displaying:

high dependability, owing to the fact that it is a mechanically-based system (linkage 4, ram 7, . . . ) and to the possibility of being able to continue to operate when its electrical part (essentially the computer 9) breaks down; and a low cost, because it is based on a conventional mechanical device and requires no redundancy between its constituent elements.

As can be seen in FIGS. 1 and 2, the trim means 13 is connected to the computer 9 by a link 14, it is capable of acting on said control 3 as indicated by a link 15 and it is activated, in the usual way, when said control 3 is not being operated by the pilot.

According to the invention, said trim means 13 which is capable of acting on the ram 7 via a link 16 and a subtracter element 17 (which subtracts the commands of said means 13 from those of the computer 9) is improved in that it is also activated when the control 3 is being operated by the pilot.

In the embodiment of FIG. 2, the device 1a in accordance with the invention comprises an auxiliary control 18, depicted in the form of a mini stick, and the sensor 10 measures the action exerted on this auxiliary control 18 (via link 11a) rather than the action exerted on the control 3.

Depending on the embodiment envisaged:

either said controls 3 and 18 may be set out so that they can be operated by one and the same pilot of the aircraft;

or, in the case of an aircraft with two pilots, one 3 of said controls may be operated by a first of said pilots and the other control 18 may be operated by the second pilot.

Furthermore, in another embodiment which has not been depicted, said control and said auxiliary control are adapted to one another so as to form a single assembly, while at the same time being able to be operated separately.

What is claimed is:

1. An apparatus for operating a controlled member (2) on a rotary-wing aircraft, said apparatus (1) comprising:

at least one control (3) intended to be subject to the action of a pilot of said rotary-wing aircraft and capable of moving a linkage (4);

means (5) connected to said linkage (4) for operating said controlled member (2) as a function of movement of said linkage (4);

a first control device of a first type, said first control device comprising a ram (7) incorporated into the linkage (4) which is capable of influencing the movement of said linkage (4) as a function of control commands received;

a second control device of a second type different than said first type, said second control device comprising a trim means (13) capable of acting on the control (3) and on the linkage (4) as a function of control commands received;

a computer (9) determining said control commands which are transmitted to said ram (7) and to said trim means (13); and at least one sensor (10) which is capable of measuring the values of a parameter that represents an action exerted by a pilot of the rotary-wing aircraft on said control (3), wherein said computer (9) uses the values measured by said sensor (10) to determine said control commands to create control objectives, wherein the parameter measured by said sensor (10) is relative movement of said control (3) with respect to the position of the trim means (13).

2. An apparatus for operating a controlled member (2) on a rotary-wing aircraft, said apparatus (1) comprising:

at least one control (3) intended to be subject to the action of a pilot of said rotary-wing aircraft and capable of moving a linkage (4);

means (5) connected to said linkage (4) for operating said controlled member (2) as a function of movement of said linkage (4);

a first control device of a first type, said first control device comprising a ram (7) incorporated into the linkage (4) which is capable of influencing the movement of said linkage (4) as a function of control commands received;

a second control device of a second type different than said first type, said second control device comprising a trim means (13) capable of acting on the control (3) and on the linkage (4) as a function of control commands received;

a computer (9) determining said control commands which are transmitted to said ram (7) and to said trim means (13); and at least one sensor (10) which is capable of measuring the values of a parameter that represents an action exerted by a pilot of the rotary-wing aircraft on an auxiliary control (3, 18), wherein said computer (9) uses the values measured by said sensor (10) to determine said control commands to create control objectives, and wherein said control (3) and said auxiliary control (18) are set out on the rotary-wing aircraft in such a way as to be accessible and operable by one and the same pilot of said aircraft, wherein the parameter measured by said sensor (10) is relative movement of said auxiliary control (3, 18) with respect to the position of the trim means (13).

3. An apparatus for operating a controlled member (2) on a rotary-wing aircraft, said apparatus (1) comprising:

at least one control (3) intended to be subject to the action of a pilot of said rotary-wing aircraft and capable of moving a linkage (4);

means (5) connected to said linkage (4) for operating said controlled member (2) as a function of movement of said linkage (4);

a first control device of a first type, said first control device comprising a ram (7) incorporated into the linkage (4) which is capable of influencing the movement of said linkage (4) as a function of control commands received;

a second control device of a second type different than said first type, said second control device comprising a trim means (13) capable of acting on the control (3) and on the linkage (4) as a function of control commands received;

a computer (9) determining said control commands which are transmitted to said ram (7) and to said trim means (13); and at least one sensor (10) which is capable of measuring the values of a parameter that represents an action exerted by a pilot of the rotary-wing aircraft on an auxiliary control (3, 18), wherein said computer (9) uses the values measured by said sensor (10) to determine said control commands to create control objectives, wherein, for a rotary-wing aircraft flown by two pilots, said control (3) is subject to the action of one of said pilots, and wherein said auxiliary control (18) is subject to the action of the other pilot, wherein the parameter measured by said sensor (10) is relative movement of said auxiliary control (3, 18) with respect to the position of the trim means (13).

4. An apparatus for operating a controlled member (2) on a rotary-wing aircraft, said apparatus (1) comprising:

at least one control (3) intended to be subject to the action of a pilot of said rotary-wing aircraft and capable of moving a linkage (4);

means (5) connected to said linkage (4) for operating said controlled member (2) as a function of movement of said linkage (4);

a first control device of a first type, said first control device comprising a ram (7) incorporated into the linkage (4) which is capable of influencing the movement of said linkage (4) as a function of control commands received;

a second control device of a second type different than said first type, said second control device comprising a trim means (13) capable of acting on the control (3) and on the linkage (4) as a function of control commands received;

a computer (9) determining said control commands which are transmitted to said ram (7) and to said trim means (13); and at least one sensor (10) which is capable of measuring the values of a parameter that represents an action exerted by a pilot of the rotary-wing aircraft on an auxiliary control (3, 18), wherein said computer (9) uses the values measured by said sensor (10) to determine said control commands to create control objectives, and wherein said control (3) and said auxiliary control are adapted to one another so as to form a single assembly while being able to be operated separately, wherein the parameter measured by said sensor (10) is relative movement of said auxiliary control (3, 18) with respect to the position of the trim means (13).

* * * * *